United States Patent
Picchetti (10) Patent No.: US 10,582,568 B1
(45) Date of Patent: Mar. 3, 2020

(54) DUAL PHONE

(71) Applicant: Kyle Picchetti, San Clemente, CA (US)

(72) Inventor: Kyle Picchetti, San Clemente, CA (US)

( * ) Notice: Subject to any disclaimer, the term of this patent is extended or adjusted under 35 U.S.C. 154(b) by 0 days.

(21) Appl. No.: 16/114,342

(22) Filed: Aug. 28, 2018

(51) Int. Cl.
*G06F 21/62* (2013.01)
*H04L 29/06* (2006.01)
*H04W 8/18* (2009.01)
*H04W 88/06* (2009.01)
*H04B 1/3816* (2015.01)

(52) U.S. Cl.
CPC .......... *H04W 88/06* (2013.01); *G06F 21/629* (2013.01); *G06F 21/6245* (2013.01); *H04B 1/3816* (2013.01); *H04L 63/10* (2013.01); *H04W 8/183* (2013.01)

(58) Field of Classification Search
CPC ...... H04W 88/06; H04W 8/183; H04L 63/10; G06F 21/629; G06F 21/6245; H04B 1/3816
See application file for complete search history.

(56) References Cited

U.S. PATENT DOCUMENTS

| | | |
|---|---|---|
| 6,062,887 A | 5/2000 | Schuster |
| 6,623,305 B2 | 9/2003 | Chun-Lung |
| 6,889,059 B1 | 5/2005 | Fragola |
| 7,808,549 B2 | 10/2010 | Kanai |
| 8,699,212 B2 | 4/2014 | Galerne |
| 9,008,636 B2 | 4/2015 | Helfre |
| D749,571 S | 2/2016 | Park |
| 2007/0182663 A1 | 8/2007 | Biech |
| 2007/0191061 A1 | 8/2007 | Chuang |
| 2017/0127217 A1* | 5/2017 | Miao ............... H04W 76/10 |

FOREIGN PATENT DOCUMENTS

WO   2010140781   2/2011

* cited by examiner

*Primary Examiner* — Joseph E Dean, Jr.

(57) ABSTRACT

The dual phone comprises a personal data device, a commercially provided and publicly available cellular wireless network, and a wireless communication link. The dual phone is a dual mode device. By dual mode is meant that the same personal data device interfaces with the commercially provided and publicly available cellular wireless network using a plurality of account settings. An example of the use of the plurality of account settings is to operate the personal data device with a personal account and a professional account.

18 Claims, 4 Drawing Sheets

DUAL PHONE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity and electric communication techniques, more specifically, a terminal device configured for use with a wireless communication network with at least two operational modes. (H04W88/06)

SUMMARY OF INVENTION

The dual phone comprises a personal data device, a commercially provided and publicly available cellular wireless network, and a wireless communication link. The dual phone is a dual mode device. By dual mode is meant that the same personal data device interfaces with the commercially provided and publicly available cellular wireless network using a plurality of account settings. An example of the use of the plurality of account settings is to operate the personal data device with a personal account and a professional account.

These together with additional objects, features and advantages of the dual phone will be readily apparent to those of ordinary skill in the art upon reading the following detailed description of the presently preferred, but nonetheless illustrative, embodiments when taken in conjunction with the accompanying drawings.

In this respect, before explaining the current embodiments of the dual phone in detail, it is to be understood that the dual phone is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dual phone.

It is therefore important that the claims be regarded as including such equivalent construction insofar as they do not depart from the spirit and scope of the dual phone. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 4.

Figure 4:
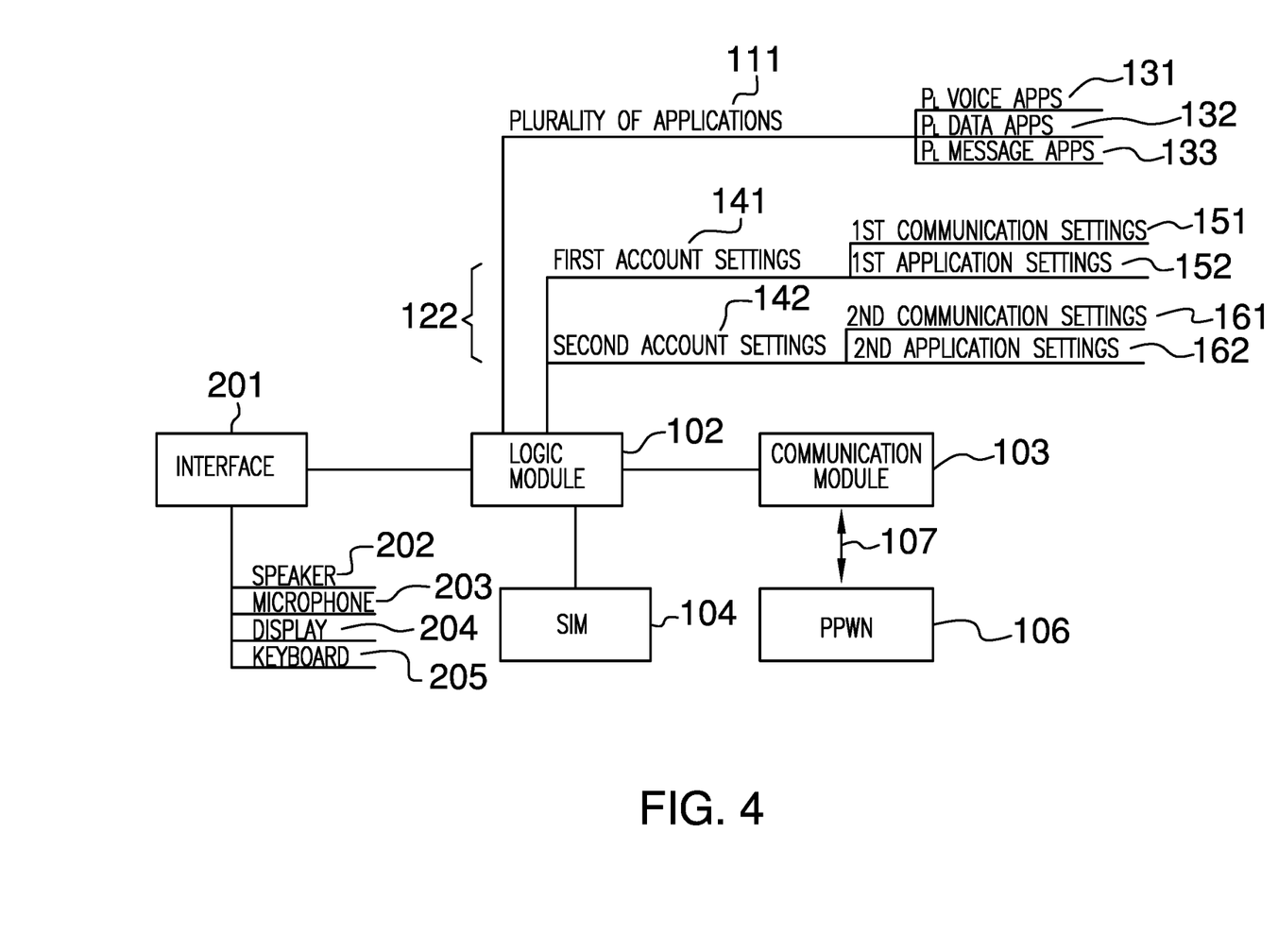
FIG. 4 is a block diagram of an embodiment of the disclosure.

The dual phone 100 (hereinafter invention) comprises a personal data device 101, a commercially provided and publicly available cellular wireless network 106, and a wireless communication link 107. The wireless communication link 107 establishes a communication channel between the personal data device 101 and the commercially provided and publicly available cellular wireless network 106. The invention 100 is a dual mode device. By dual mode is meant that the same personal data device 101 interfaces with the commercially provided and publicly available cellular wireless network 106 using a plurality of accounts 122. An example of the use of the plurality of accounts 122 is to operate the personal data device 101 with a personal account and a professional account.

The personal data device 101 is a programmable electrical device that provides data management and communication services through one or more functions referred to as the plurality of applications 111. The plurality of applications 111 are sets of logical operating instructions that are performed by the personal data device 101. The addition of the plurality of applications 111 will provide increased functionality for the personal data device 101. Within the context of this disclosure, it is assumed that the plurality of applications 111 has been developed for the purpose of interacting with the invention 100. Methods to design and implement the plurality of applications 111 on a personal data device 101 are well known and documented in the electrical arts.

The personal data device 101 comprises a logic module 102, a communication module 103, a SIM module 104, a housing 105, and an interface 201.

The logic module 102 is a readily and commercially available programmable electronic device used to manage, regulate, and operate the personal data device 101. Depending on the specific design and the selected components, the logic module 102 can be a separate component within the personal data device 101 or the functions of the logic module 102 can be incorporated into another component within the personal data device 101.

The communication module 103 communicates voice, data, and text communications between the logic module 102 and a commercially provided and publicly available cellular wireless network 106. The use of the commercially provided and publicly available cellular wireless network 106 is preferred because: 1) of its low cost; 2) of the widespread availability and the broad interoperability between competing commercially provided and publicly available cellular wireless networks 106; and, 3) methods and techniques to access data management and communication services over a commercially provided and publicly available cellular wireless network 106 are well known and documented by those skilled in the electrical arts. The commercially provided and publicly available cellular wireless network 106 is defined in greater detail elsewhere in this disclosure.

The logic module 102 operates a plurality of applications 111. Each of the plurality of applications 111 is a data processing function provided by the personal data device 101. The plurality of applications 111 provide voice communication services, data communication services, and messaging services on the personal data device 101. Each application selected from the plurality of applications 111 is associated with an account selected from the plurality of accounts 122 that support the personal data device 101 of the invention 100. The personal data device 101 and the SIM module 104 operate to properly associate each application selected from the plurality of applications 111 with the appropriate account selected from the plurality of accounts 122. The plurality of applications 111 comprises a plurality of voice applications 131, a plurality of data applications 132, and a plurality of messaging applications 133.

Each of the plurality of voice applications 131 refers to a data processing function that the provide voice communication services of the personal data device 101. Each of the plurality of voice applications 131 is associated with an account selected from the plurality of accounts 122.

Each of the plurality of data applications 132 refers to a data processing function that the provide data communication services of the personal data device 101. Examples of data communication services include, but are not limited to, internet access, social media access, database access, and private access to commercial enterprises. Each of the plurality of data applications 132 is associated with an account selected from the personal data device 101.

The plurality of messaging applications 133 refers to a data processing function that provides messaging communication services of the personal data device 101. Examples of messaging communication services include, but are not limited to, SMS and MMS services, social media services, broadcast services (such as Twitter®), and subscription message services commonly associated with social media. Each of the plurality of messaging applications 133 is associated with an account selected from the personal data device 101.

The SIM module 104 is an electric circuit used to enable the operation of the personal data device 101. Specifically, the SIM module 104 provides the logic module 102 with the identification information, the authorization for access, and the security access required to allow the personal data device 101 to communicate with the commercially provided and publicly available cellular wireless network 106.

In a traditional personal data device 101, the SIM module 104 grants access to the commercially provided and publicly available cellular wireless network 106 to a single account associated with the commercially provided and publicly available cellular wireless network 106.

In the current disclosure, the logic module 102 works in conjunction with the SIM module 104 to allow the SIM module 104 to associate a plurality of accounts 122 with one or more commercially provided and publicly available cellular wireless network 106. The SIM module 104 comprises a SIM card 121 and a plurality of accounts 122.

The SIM card 121 is the physical electrical circuit that provides each of the plurality of accounts 122 with authorized access to the commercially provided and publicly available cellular wireless network 106. The SIM card 121 is defined in more detail elsewhere in this disclosure.

Each of the plurality of accounts 122 refers to an individual transactional relationship between the owner of the invention 100 and the operator of the commercially provided and publicly available cellular wireless network 106. The plurality of accounts 122 comprises the first account 141 and the second account 142.

The first account 141 is a first account 141 selected from the plurality of accounts 122. The first account 141 comprises a set of first communication settings 151 and a set of first application settings 152. The second account 142 comprises a set of second communication settings 161 and a set of second application settings 162.

The first communication settings 151 refers to the authorizations and security codes associated with the first account 141 that are required to allow the personal data device 101 to access the rights and privileges provided to the first account 141 as the commercially provided and publicly available cellular wireless network 106.

The first application settings 152 refers to the authorizations and security codes associated with each application selected from the plurality of applications 111 that are required to allow the selected application to operate under the privileges provided to the first account 141.

The second account 142 is a second account 142 selected from the plurality of accounts 122. The second account 142 is a separate commercial transaction with a commercially provided and publicly available cellular wireless network 106 that is independent from the first account 141.

The second communication settings 161 refers to the authorizations and security codes associated with the second account 142 that are required to allow the personal data device 101 to access the rights and privileges provided to the second account 142 as the commercially provided and publicly available cellular wireless network 106.

The second application settings 162 refers to the authorizations and security codes associated with each application selected from the plurality of applications 111 that are required to allow the selected application to operate under the privileges provided to the second account 142.

Figure 2:
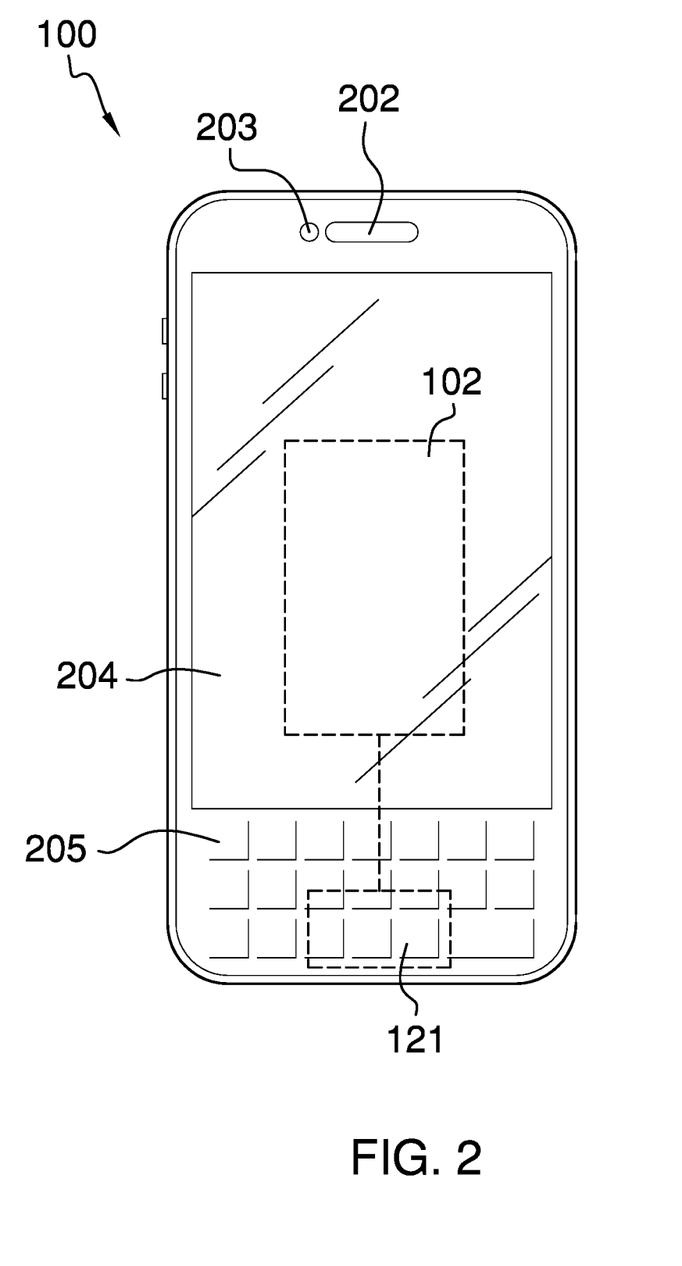
FIG. 2 is a front view of an embodiment of the disclosure.

The interface 201 comprises a collection of electrical devices and transducers used for manually controlling each of the plurality of applications 111. The interface 201 comprises a speaker 202, a microphone 203, a display 204, and a keyboard 205. The speaker 202 is a transducer. The speaker 202 converts electrical signals generated by the logic module 102 into audible sounds. The microphone 203 is a transducer. The microphone 203 converts acoustic energy into electrical signals that are transmitted to the logic module 102. The display 204 is an electrical device. The display 204 generates visual images used for the operation of the invention 100. The keyboard 205 is an electromechanical device. The keyboard 205 is a tactile device. The keyboard 205 is a well-known and documented device used for transmitting operating direction to the logic module 102.

Figure 1:
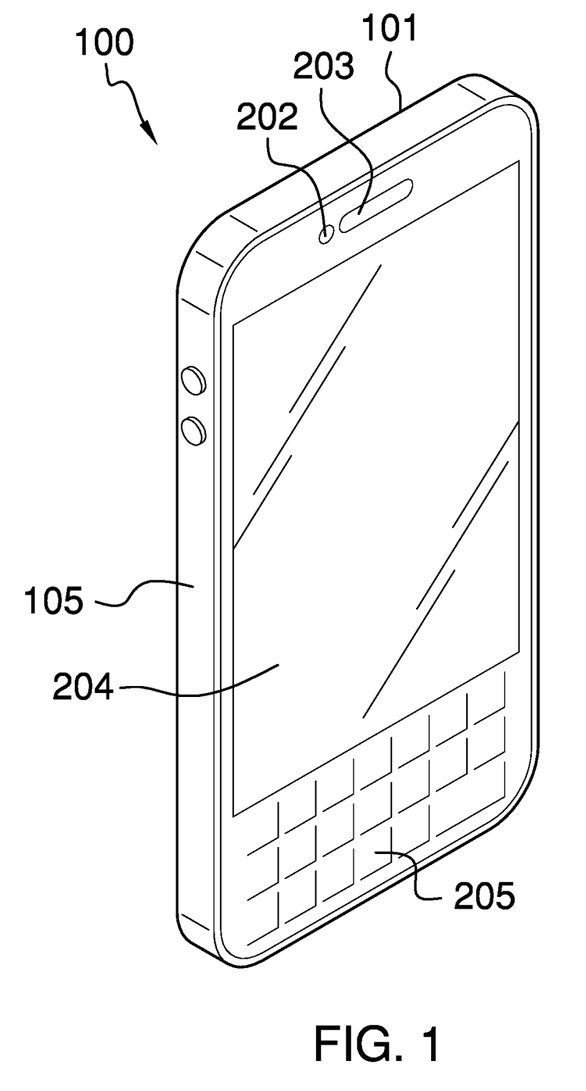
FIG. 1 is a perspective view of an embodiment of the disclosure.

The housing 105 is a casing. The housing 105 contains the logic module 102, the communication module 103, and the SIM module 104. The housing 105 is formed with all apertures and form factors necessary to allow the housing 105 to accommodate the use and operation of the personal data device 101. Methods to form a housing 105 suitable for the purposes described in this disclosure are well-known and documented in the mechanical arts.

Figure 3:
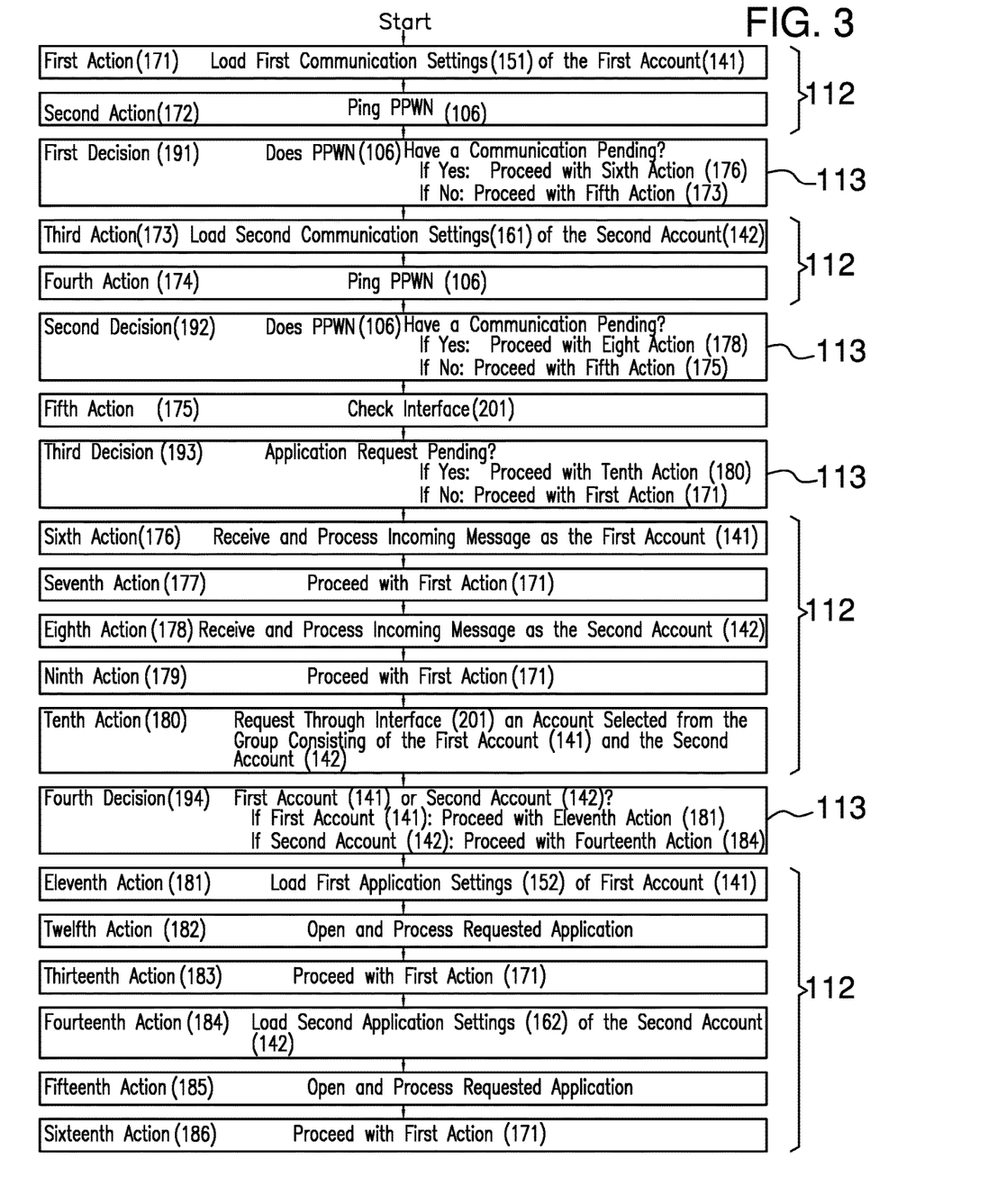
FIG. 3 is a flowchart of an embodiment of the disclosure.

The logic module 102 integrates the plurality of accounts 122 into the personal data device 101 using a plurality of actions 112 and a plurality of decisions 113.

The plurality of actions 112 comprises the operational requirements required to associate each selected application with the associated account. The plurality of actions 112 comprises a first action 171, a second action 172, a third action 173, a fourth action 174, a fifth action 175, a sixth action 176, a seventh action 177, an eighth action 178, a ninth action 179, a tenth action 180, an eleventh action 181, a twelfth action 182, a thirteenth action 183, a fourteenth action 184, a fifteenth action 185, and a sixteenth action 186.

The plurality of decisions 113 comprises the selection criteria required to associate each selected application with the associated account. The plurality of decisions 113 comprises a first decision 191, a second decision 192, a third decision 193, and a fourth decision 194.

The following eight paragraphs describe the operation of the invention 100.

The logic module 102 takes the first action 171 of loading the first communication settings 151 of the first account 141 into the SIM card 121. The logic module 102 takes the second action 172 to contact the commercially provided and publicly available cellular wireless network 106 to query for pending communications for the first account 141. The logic module 102 makes the first decision 191 to determine if a communication is pending for the first account 141. If a communication is pending, the logic module 102 proceeds to the sixth action 176. If a communication is not pending, the logic module 102 proceeds to the third action 173.

The logic module 102 takes the third action 173 of loading the second communication settings 161 of the second account 142 into the SIM card 121. The logic module 102 takes the fourth action 174 to contact the commercially provided and publicly available cellular wireless network 106 to query for pending communications for the second account 142. The logic module 102 makes the second decision 192 to determine if a communication is pending for the second account 142. If a communication is pending, the logic module 102 proceeds to the eighth action 178. If a communication is not pending, the logic module 102 proceeds to the fifth action 175.

The logic module 102 takes the fifth action 175 of checking the interface 201 for a requested service. The logic module 102 makes the third decision 193 to determine if the service of an application selected from the plurality of applications 111 has been requested. If the service of an application selected from the plurality of applications 111 has been requested, the logic module 102 proceeds to the tenth action 180. If the service of an application selected from the plurality of applications 111 has not been requested, the logic module 102 proceeds to the first action 171.

The logic module 102 takes the sixth action 176 of receiving and processing the incoming communication as the first account 141. When the logic module 102 completes the sixth action 176, the logic module 102 takes a seventh action 177 to loop back to the first action 171.

The logic module 102 takes the eighth action 178 of receiving and processing the incoming communication as the second account 142. When the logic module 102 completes the eighth action 178, the logic module 102 takes a ninth action 179 to loop back to the first action 171.

The logic module 102 takes the tenth action 180 of requesting from the interface 201 an account selected from the plurality of accounts 122 to be associated with the selected application. The logic module 102 makes the fourth decision 194 to determine whether the selected account is the first account 141 or the second account 142. If the selected account is the first account 141, the logic module 102 proceeds to the eleventh action 181. If the selected account is the second account 142, the logic module 102 proceeds to the fourteenth action 184.

The logic module 102 takes the eleventh action 181 of loading the first application settings 152 into the logic module 102. The logic module 102 takes the twelfth action 182 of opening and processing the selected application under the first account 141. The logic module 102 takes the thirteenth action 183 of proceeding to the first action 171.

The logic module 102 takes the fourteenth action 184 of loading the second application settings 162 into the logic module 102. The logic module 102 takes the fifteenth action 185 of opening and processing the selected application under the second account 142. The logic module 102 takes the sixteenth action 186 of proceeding to the first action 171.

The following definitions were used in this disclosure:

Application or App: As used in this disclosure, an application or app is a self-contained piece of software that is specially designed or downloaded for use with a personal data device.

Commercially Provided And Publicly Available Cellular Wireless Network: As used in this disclosure, a commercially provided and publicly available cellular wireless network refers to subscription-based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Display: As used in this disclosure, a display is a surface upon which is presented an image, potentially including, but not limited to, graphic images and text, that is interpretable by an individual viewing the projected image in a meaningful manner.

Form Factor: As used in this disclosure, the term form factor refers to the size and shape of an object.

Housing: As used in this disclosure, a housing is a rigid casing that encloses and protects one or more devices.

Interface: As used in this disclosure, an interface is a physical or virtual boundary that separates two different systems across which information is exchanged.

Keyboard: As used in this disclosure, a keyboard is a panel that further comprises a plurality of buttons that are commonly referred to as keys. The keyboard is commonly used to operate devices including, but not limited to, logical devices and musical instruments.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Logical Device: As used in this disclosure, a logical device is a programmable electrical device that processes externally provided inputs to generate outputs that are determined from a previously programmed set of instructions. Microphone: As used in this disclosure, a microphone is a transducer that converts the energy from vibration into electrical energy. The sources of vibrations include, but are not limited to, acoustic energy.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones. See logical device PPWN: As used in this disclosure, the PPWN is an acronym for publically provided wireless network. The PPWN refers to a commercially provided and publicly available cellular wireless network.

SIM Card: As used in this disclosure, a SIM card is an electronic circuit that provides a commercially provided and publicly available cellular wireless network with the identification information, authorization information, and security information required to allow a persona data device to access the commercially provided and publicly available cellular wireless network.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Speaker: As used in this disclosure, a speaker is an electrical transducer that converts an electrical signal into an audible sound.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Transducer: As used in this disclosure, a transducer is a device that converts a physical quantity, such as pressure or brightness into an electrical signal or a device that converts an electrical signal into a physical quantity.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A dual mode phone comprising:
a personal data device, a commercially provided and publicly available cellular wireless network, and a wireless communication link;
wherein the wireless communication link establishes a communication channel between the personal data device and the commercially provided and publicly available cellular wireless network;
wherein the dual mode phone is a dual mode device;
wherein by dual mode is meant that the same personal data device interfaces with the commercially provided and publicly available cellular wireless network using a plurality of accounts;
wherein the plurality of accounts comprises a first account and a second account;
wherein the first account establishes an association between the personal data device and the commercially provided and publicly available cellular wireless network;
wherein the second account establishes an association between the personal data device and the commercially provided and publicly available cellular wireless network;
wherein the first account comprises a set of first communication settings and a set of first application settings;
wherein the first communication settings comprises the authorizations and security codes associated with the first account that are required to allow the personal data device to access the rights and privileges provided to the first account as the commercially provided and publicly available cellular wireless network;
wherein the first application settings comprises the authorizations and security codes associated with each application selected from the plurality of applications that are required to allow the selected application to operate under the privileges provided to the first account.

2. The dual mode phone according to claim 1
wherein the personal data device is a programmable electrical device;
wherein the personal data device provides data management and communication services through a plurality of applications.

3. The dual mode phone according to claim 2
wherein the personal data device comprises a logic module, a communication module, a SIM module, a housing, and an interface;
wherein the logic module, the communication module, the SIM module, and the interface are contained within the housing;
wherein the logic module, the communication module, the SIM module, and the interface are electrically connected;
wherein the logic module manage, regulate, and operate the personal data device;
wherein the communication module communicates voice, data, and text communications between the logic module and the commercially provided and publicly available cellular wireless network.

4. The dual mode phone according to claim 3
wherein each of the plurality of applications is a data processing function provided by the personal data device;
wherein the plurality of applications provide voice communication services, data communication services, and messaging services on the personal data device;
wherein each application selected from the plurality of applications is associated with an account selected from the plurality of accounts that support the personal data device of the dual mode phone.

5. The dual mode phone according to claim 4 wherein the personal data device and the SIM module interoperate to properly associate each application selected from the plurality of applications with an appropriate account selected from the plurality of accounts.

6. The dual mode phone according to claim 5
wherein the plurality of applications comprises a plurality of voice applications, a plurality of data applications, and a plurality of messaging applications;
wherein each of the plurality of voice applications refers to a data processing function that the provide voice communication services for the personal data device;
wherein each of the plurality of data applications refers to a data processing function that the provide data communication services of the personal data device;
wherein the plurality of messaging applications refers to a data processing function that provides messaging communication services of the personal data device.

7. The dual mode phone according to claim 6 wherein the interface comprises a collection of electrical devices and transducers used for manually controlling each of the plurality of applications.

8. The dual mode phone according to claim 7 wherein each of the plurality of voice applications is associated with an account selected from the plurality of accounts;
wherein each of the plurality of data applications is associated with an account selected from the personal data device;
wherein each the plurality of messaging applications is associated with an account selected from the personal data device.

9. The dual mode phone according to claim 8
wherein the SIM module is an electric circuit;
wherein the SIM module enables the operation of the personal data device;
wherein the SIM module allows the logic module to associate a plurality of accounts with one or more commercially provided and publicly available cellular wireless network.

10. The dual mode phone according to claim 9
wherein the SIM module comprises a SIM card and a plurality of accounts;
wherein the SIM card is the physical electrical circuit that provides each of the plurality of accounts with authorized access to the commercially provided and publicly available cellular wireless network;
wherein each of the plurality of accounts establishes an individual relationship between the dual mode phone and the commercially provided and publicly available cellular wireless network.

11. The dual mode phone according to claim 10
wherein the second account comprises a set of second communication settings and a set of second application settings;
wherein the second communication settings refers to the authorizations and security codes associated with the second account that are required to allow the personal data device to access the rights and privileges provided to the second account as the commercially provided and publicly available cellular wireless network;
wherein the second application settings refers to the authorizations and security codes associated with each application selected from the plurality of applications that are required to allow the selected application to operate under the privileges provided to the second account.

12. The dual mode phone according to claim 11 wherein the second account is a separate commercial transaction with a commercially provided and publicly available cellular wireless network that is independent from the first account.

13. The dual mode phone according to claim 12
wherein the interface comprises a speaker, a microphone, a display, and a keyboard;
wherein the speaker, the microphone, the display, and the keyboard electrically connect to the logic module.

14. The dual mode phone according to claim 13
wherein the speaker is a transducer;
wherein the microphone is a transducer;
wherein the speaker converts electrical signals generated by the logic module into audible sounds;
wherein the microphone converts acoustic energy into electrical signals.

15. The dual mode phone according to claim 14
wherein the display is an electrical device;
wherein the display generates visual images;
wherein the keyboard is an electromechanical device;
wherein the keyboard is a tactile device.

16. The dual mode phone according to claim 15
wherein the housing is a casing;
wherein the housing contains the logic module, the communication module, and the SIM module.

17. The dual mode phone according to claim 16 wherein the logic module is a programmable electric device.

18. The dual mode phone according to claim 16
wherein the logic module is a programmable electric device;
wherein the logic module integrates the plurality of accounts into the personal data device using a plurality of actions and a plurality of decisions;
wherein the plurality of actions comprises the operational requirements required to associate each selected application with the associated account;
wherein the plurality of actions comprises a first action, a second action, a third action, a fourth action, a fifth action, a sixth action, a seventh action, an eighth action, a ninth action, a tenth action, an eleventh action, a twelfth action, a thirteenth action, a fourteenth action, a fifteenth action, and a sixteenth action;
wherein the plurality of decisions comprises the selection criteria required to associate each selected application with the associated account;
wherein the plurality of decisions comprises a first decision, a second decision, a third decision, and a fourth decision;
wherein the logic module takes the first action of loading the first communication settings of the first account into the SIM card;
wherein the logic module takes the second action to contact the commercially provided and publicly available cellular wireless network to query for pending communications for the first account;

wherein the logic module makes the first decision to determine if a communication is pending for the first account;

wherein the logic module takes the third action of loading the second communication settings of the second account into the SIM card;

wherein the logic module takes the fourth action to contact the commercially provided and publicly available cellular wireless network to query for pending communications for the second account;

wherein the logic module makes the second decision to determine if a communication is pending for the second account;

wherein the logic module takes the fifth action of checking the interface for a requested service;

wherein the logic module makes the third decision to determine if the service of an application selected from the plurality of applications has been requested;

wherein the logic module takes the sixth action of receiving and processing the incoming communication as the first account;

wherein the logic module takes the seventh action to loop back to the first action;

wherein the logic module takes the eighth action of receiving and processing the incoming communication as the second account;

wherein the logic module takes a ninth action to loop back to the first action;

wherein the logic module takes the tenth action of requesting from the interface an account selected from the plurality of accounts to be associated with the selected application;

wherein the logic module makes the fourth decision to determine whether the selected account is the first account or the second account;

wherein the logic module takes the eleventh action of loading the first application settings into the logic module;

wherein the logic module takes the twelfth action of opening and processing the selected application under the first account;

wherein the logic module takes the thirteenth action of proceeding to the first action;

wherein the logic module takes the fourteenth action of loading the second application settings into the logic module;

wherein the logic module takes the fifteenth action of opening and processing the selected application under the second account;

wherein the logic module takes the sixteenth action of proceeding to the first action.

\* \* \* \* \*